Figure 7:
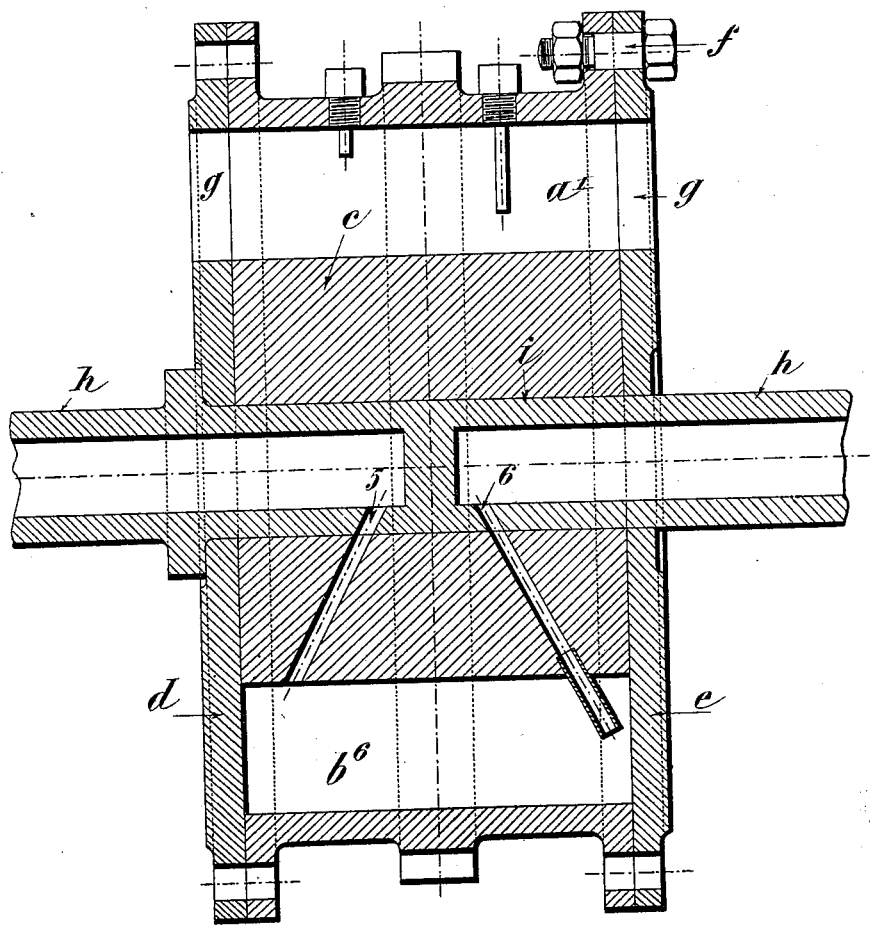

No. 674,676. Patented May 21, 1901.
L. E. H. FIÉVET.
APPARATUS FOR GENERATING AND SUPPLYING MOTIVE POWER TO MOTORS.
(Application filed Mar. 29, 1899.)
(No Model.) 8 Sheets—Sheet 1.
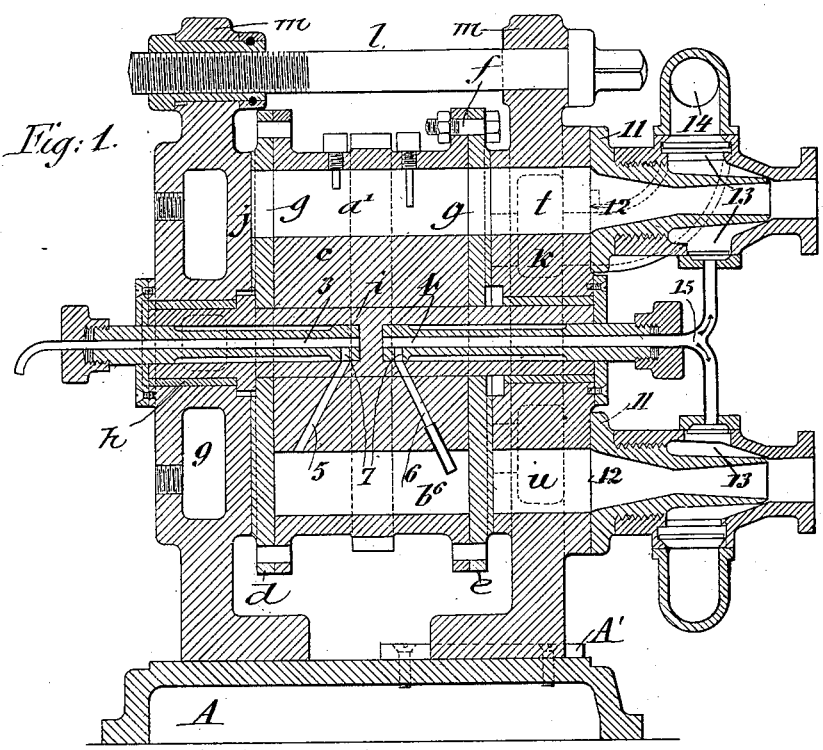
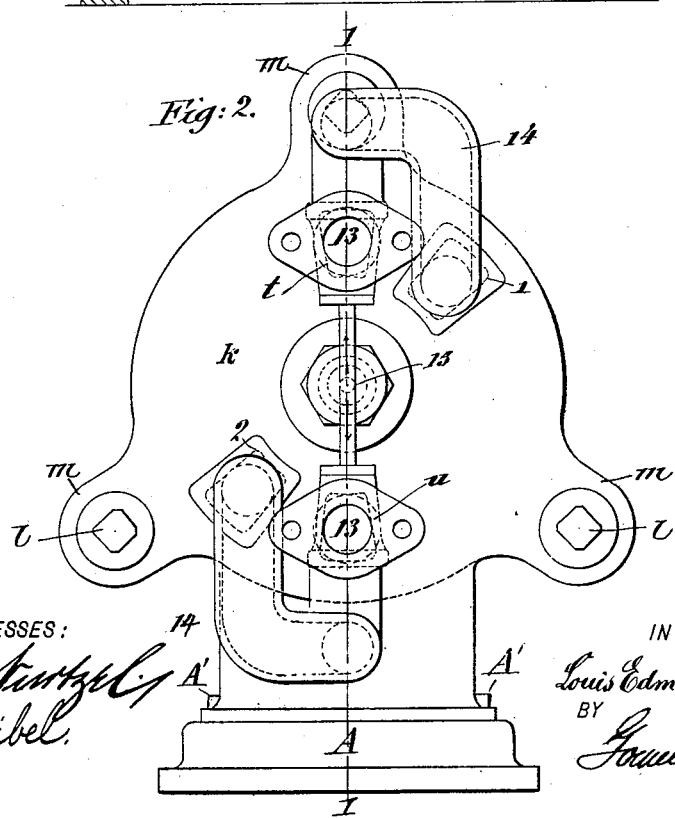
WITNESSES:
INVENTOR
Louis Edmond Henri Fiévet
BY
ATTORNEYS

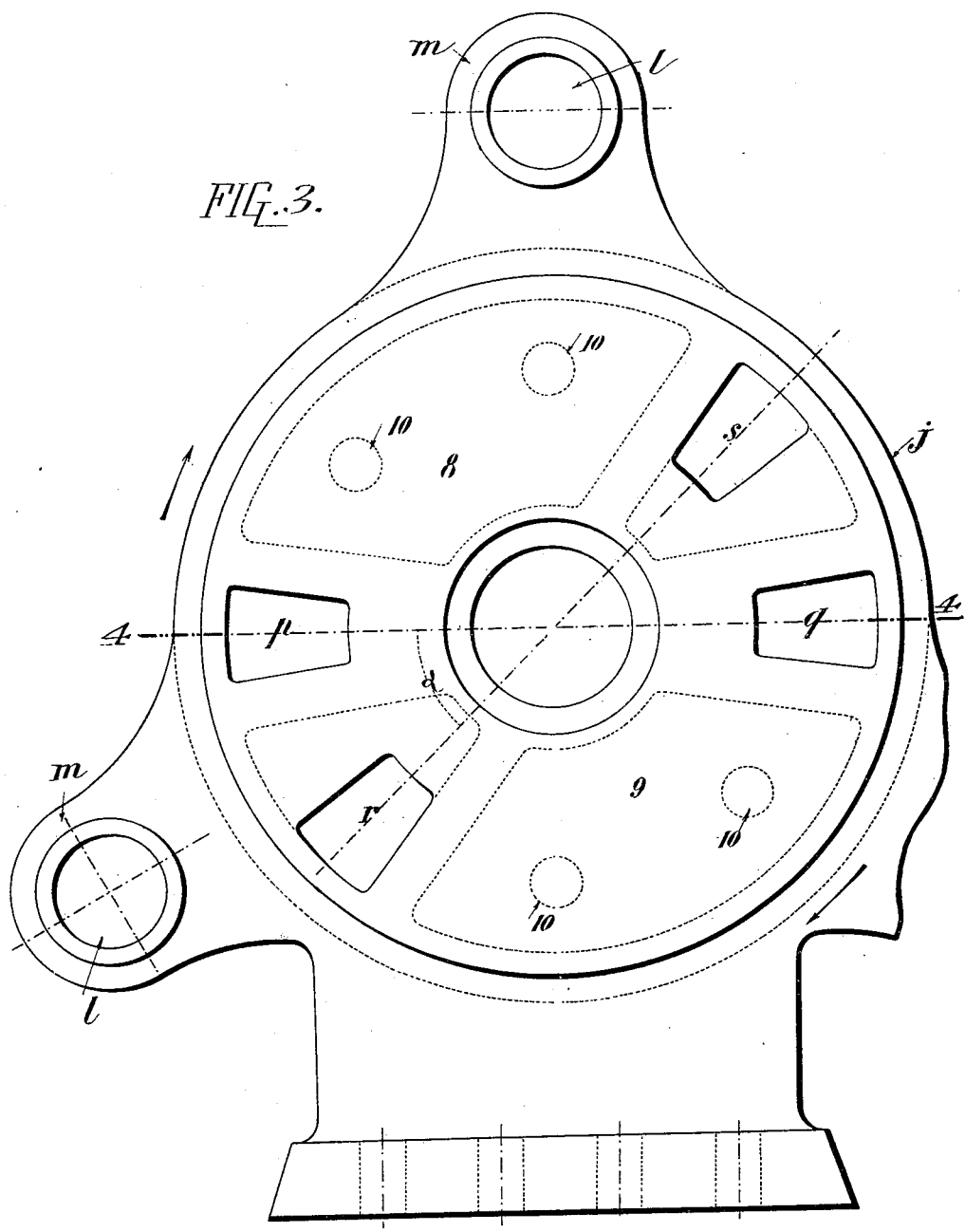

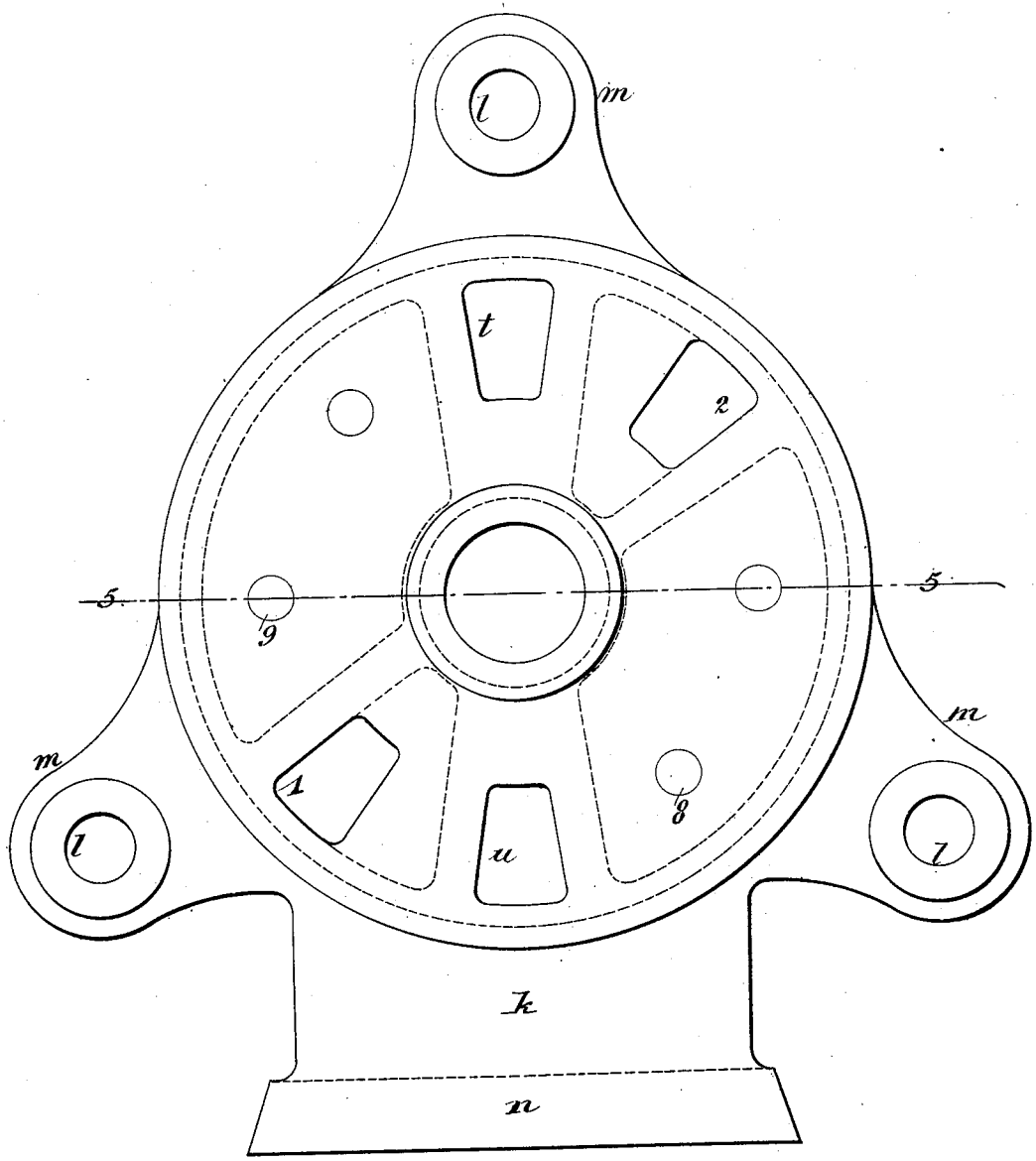

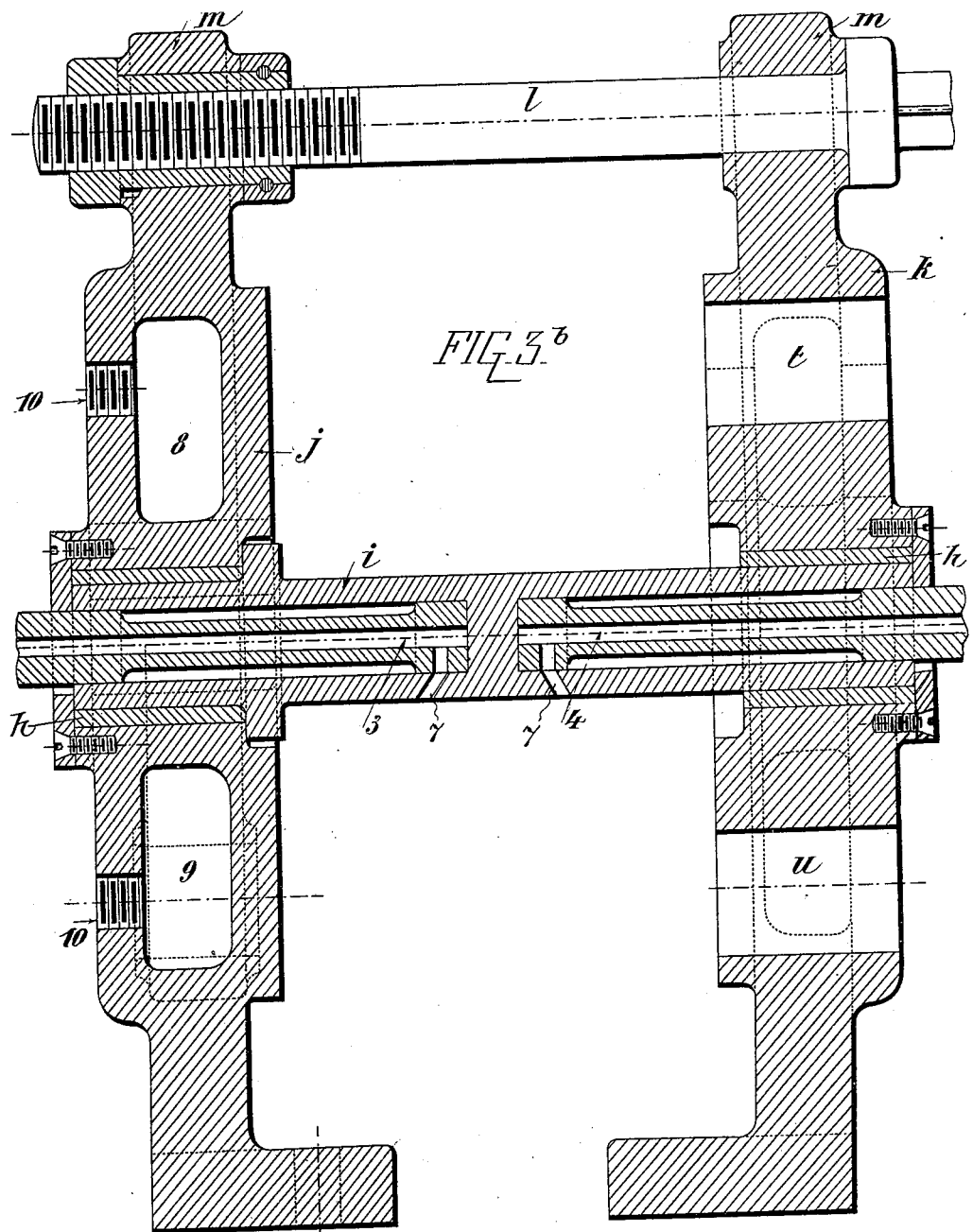

No. 674,676. Patented May 21, 1901.
L. E. H. FIÉVET.
APPARATUS FOR GENERATING AND SUPPLYING MOTIVE POWER TO MOTORS.
(Application filed Mar. 29, 1899.)
(No Model.) 8 Sheets—Sheet 5.
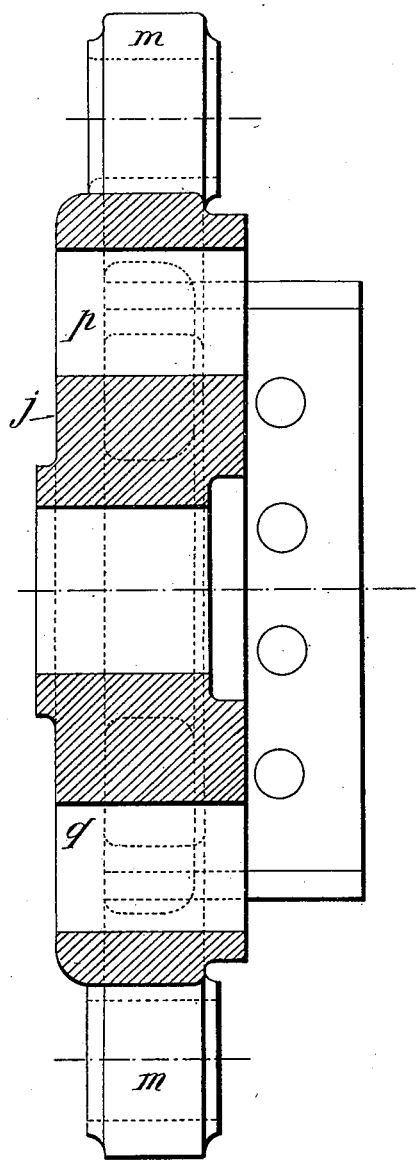
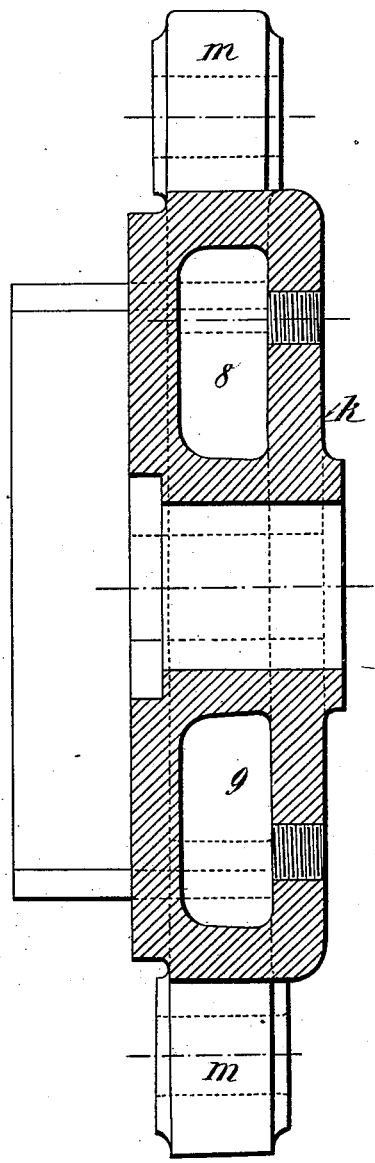

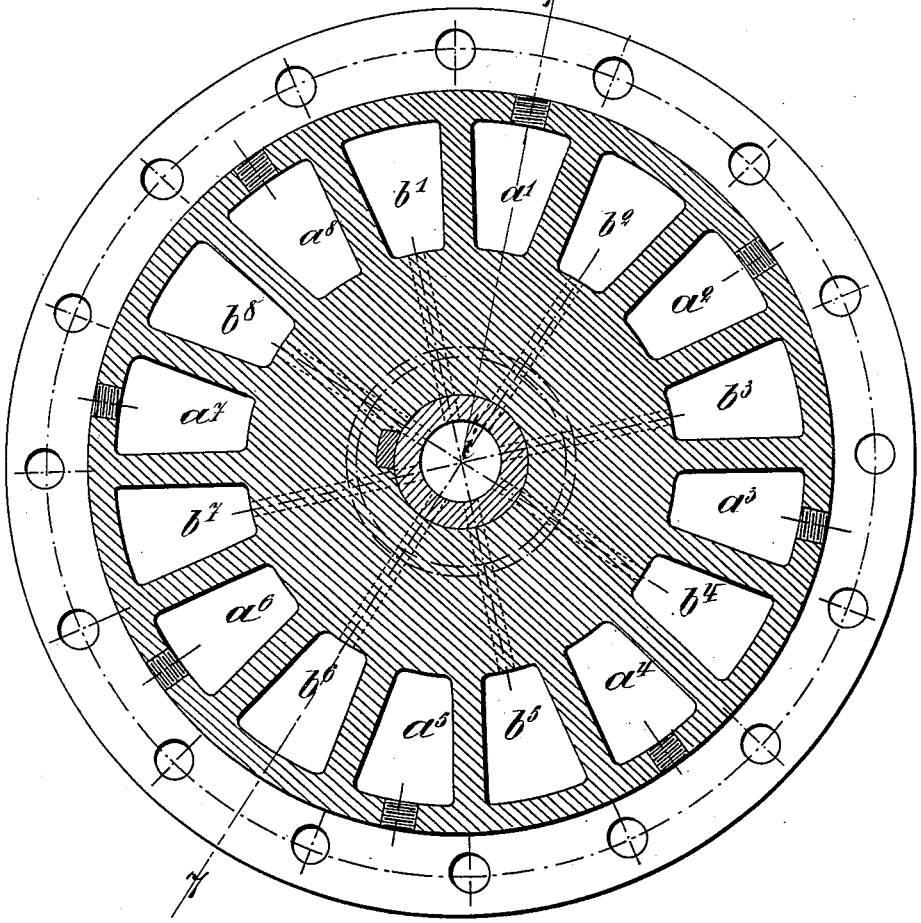

No. 674,676. Patented May 21, 1901.
L. E. H. FIÉVET.
APPARATUS FOR GENERATING AND SUPPLYING MOTIVE POWER TO MOTORS.
(Application filed Mar. 29, 1899.)
(No Model.) 8 Sheets—Sheet 7.

No. 674,676. Patented May 21, 1901.
L. E. H. FIÉVET.
APPARATUS FOR GENERATING AND SUPPLYING MOTIVE POWER TO MOTORS.
(Application filed Mar. 29, 1899.)
(No Model.) 8 Sheets—Sheet 8.
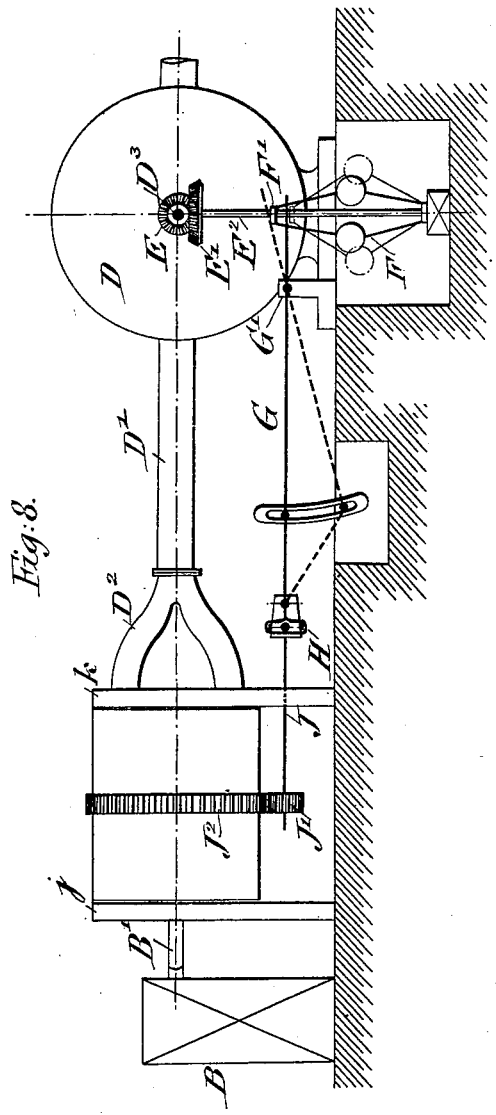
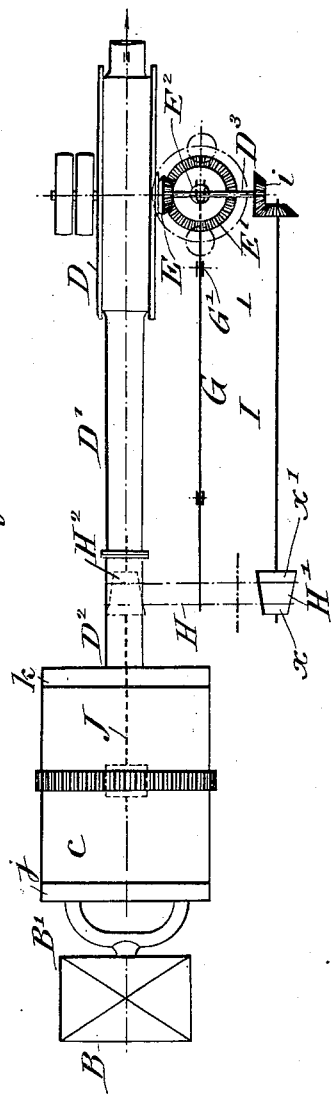
WITNESSES:
INVENTOR
Louis Edmond Henri Fiévet
BY
ATTORNEYS.

UNITED STATES PATENT OFFICE.

LOUIS EDMOND HENRI FIÉVET, OF PARIS, FRANCE.

APPARATUS FOR GENERATING AND SUPPLYING MOTIVE POWER TO MOTORS.

SPECIFICATION forming part of Letters Patent No. 674,676, dated May 21, 1901.

Application filed March 29, 1899. Serial No. 710,896. (No model.)

*To all whom it may concern:*

Be it known that I, LOUIS EDMOND HENRI FIÉVET, a citizen of the Republic of France, and a resident of Paris, in the Republic of France, have invented certain new and useful Improvements in Apparatus for Generating and Supplying Motive Power to Motors and for other Purposes, of which the following is a specification.

The present invention has for its object to so dispose the parts of an apparatus for generating and supplying motive power to motors as to obtain under one volume and at a greatly-reduced weight a comparatively greater power than heretofore. This is accomplished by a practically continuous supply of hot gases, produced by the explosion of a gas and air mixture, and by a practically continuous supply of steam or other vapors of gas and air, obtained in consequence of the cooling of the explosive apparatus made necessary by the high temperature to which the apparatus is subjected, the refrigerating fluid being employed either separately from or together with the products of combustion obtained by the explosion.

My invention consists of certain features of construction and combinations of parts to be hereinafter described and then claimed.

In the accompanying drawings, Figure 1 is a vertical central section of my apparatus on line 1 1, Fig. 2, excepting that for clearness of illustration the section of the rotary cylindrical "breech" or drum is the same as shown in Fig. 7. Fig. 2 is a rear elevation of the same. Fig. 3 is a detail elevation of the inner face of the front plate or cover through which the explosive mixture enters. Fig. 3$^a$ is a detail elevation of the back plate. Fig. 3$^b$ is a vertical central section of the front and back cover-plates and of the connecting-shaft and its interior portions, the other parts of the apparatus being omitted. Fig. 4 is a horizontal section of the front cover-plate on line 4 4, Fig. 3. Fig. 5 is a corresponding horizontal section of the back cover-plate of the apparatus on line 5 5, Fig. 3$^a$. Fig. 6 is a cross-section of the cylindrical breech or drum with the various chambers for the gas explosions and for the circulation of the cooling fluid. Fig. 7 is a cross-section of the breech and its shaft enlarged, the same being taken on line 7 7, Fig. 6; and Figs. 8 and 9 are side and plan views, respectively, showing the apparatus connected with a carbureter and motor and showing the mechanism for driving the same from the motor.

Similar characters of reference indicate corresponding parts.

Referring to the drawings, $c$ indicates a suitable cylindrical breech, which is provided with a view to balancing the pressure as regards the axis with sixteen chambers, of which eight chambers, $a'$ to $a^8$, are to serve as explosion-chambers, and the other alternate eight, $b'$ to $b^8$, interposed between the former for the cooling of the apparatus, as will be hereinafter explained. These chambers or passages traverse the breech from end to end. Against the two lateral or end faces of the breech are fixed—say by means of screw-bolts $f$—the plates $d$ and $e$, which completely close up the chambers $b' b^2$ to $b^8$, which are to serve for the cooling of the apparatus, while they are provided with orifices $g$, corresponding with the explosion-chambers $a'$ $a^8$. The breech $c$ is mounted on a tubular shaft $i$, by means of which, as will presently be described, the feeding and the emptying of the cooling-chambers are effected. The ends $h$ of the shaft pass through corresponding orifices in the flanking or cover plates $j$ $k$, Fig. 3$^b$, these two plates being firmly secured together by means of three or other number of screw-bolts $l$, passing the projections or lugs $m$ on the said plates, the bolts being provided with nuts by means of which the space between the two plates is regulated according to requirements. To this end the plate $j$ is firmly fixed to the bed-plate A of the apparatus, while the other plate $k$ by means of a dovetail connection at A' can be moved laterally in corresponding grooves in the bed-plate.

The front plate $j$, through which, as before stated, the explosive mixture is introduced, is provided with four orifices symmetrically arranged around the center. The two orifices $p$ and $q$, placed on the horizontal diameter, communicate with the supply-tube part of the explosive mixture, while the two other orifices $r$ and $s$ are open to the air. The back plate $k$ is also provided with four orifices. The orifices $t$ and $u$, placed along the vertical diameter, communicate with the conduit connecting the apparatus with the motor. The orifices 1 and 2 are open to the air.

It is to be observed that the supply or inlet orifices $p$ and $q$ of the front plate $j$ are placed along the diameter which is at right angles to the diameter along which the outlet-orifices $u$ and $t$ of the back plate are arranged. In a like manner the diameter along which the orifices $r$ $s$ of the front plate are formed forms with the diameter along which the orifices $p$ $q$ are placed an angle $a$, which angle is the same as that which the diameter of the orifices 1 2 form with that of the orifices $t$ $u$; but the orfices 1 and 2 in the back plate are respectively on opposite sides of the vertical diameters of the front plate and back plate to which the openings $s$ and $r$ in the front plate are located.

In order to explain the different operations, I will now describe what passes in one single compartment of the series $a'$ $a^8$, say compartment $a^2$. As soon as the compartment $a^2$ arrives in consequence of the rotation of the breech opposite to the orifice $q$ it is filled with the explosive gas. The breech continuing its revolution, the orifice $q$ gradually ceases to communicate with the compartment $a^2$ until the latter is completely shut off, having within it a certain charge of explosive gas. During the movement of this compartment $a^2$ from its horizontal position to the vertical the explosive mixture explodes at any required moment by means of an electric spark or an ignition-flame of any kind. The compartment $a^2$ now comes opposite the opening $u$, through which the gases produced by the explosion communicate with the motor. The breech continuing to revolve, the chamber $a^2$ comes opposite at one end to the orifice $r$ of the front plate and at the other end opposite the orifice 1 of the back plate. A current of air then passes through the whole chamber, carrying with itself the residues of the explosive gas. After this operation the chamber $a^2$ arrives before the orifice $p$ of the front plate and is again charged with explosive gas, which at the next stage is exploded, the hot gases passing to the motor by the orifice $t$, before which the said chamber $a^2$ has arrived the moment it passes through the vertical or upper part of the revolution. The breech continuing to revolve, the chamber $a^2$ comes opposite the orifice $s$ of the front plate and at the same time opposite the orifice 2 of the back plate. The residues of combustion which may still have been retained in the chamber $a^2$ are then carried off by a current of air passing through the chamber. After passing through a complete revolution the compartment $a^2$ again arrives before the inlet-orifice $q$ of the front plate, and the same order of operations is reproduced as the breech continues its revolving movement. What I have said with regard to the chamber $a^2$ is produced also in the other compartments $a'$ $a^3$ $a^4$ $a^5$ $a^6$ $a^7$ $a^8$, each of them passing through a different phase of the operations, and the same phase being produced always at the same place as regards the cover-plates, which are fixed.

Consequently as soon as the chamber $a^2$ has passed the inlet-orifice $q$ and been charged with explosive mixture the next $a'$ succeeds it and then $a^8$ $a^7$, &c., with as small intervals of time between each phase as may be desired. In this manner a kind of continuity is obtained as regards each of the phases of the operation. It will also be seen that each chamber has two explosions in every complete revolution of the breech. Therefore there is a total of sixteen explosions to each complete revolution of the breech, and if the breech revolves with a certain velocity a practically continuous series of impulses may be obtained.

The movement of the breech may be obtained from the motor itself by means of any gearing, by acting upon, for instance, the exterior periphery of the breech from a pulley or by having the shaft of the breech geared in a similar manner. To start the apparatus, a few turns are given by hand by means of a crank and pinion, and when once the machine is under way the driving is performed by the motor.

In consequence of the explosions which succeed each other very rapidly the breech or rotary barrel is heated to a considerable degree. The heat thus absorbed may be utilized for the production of steam in the cooling chambers or passages $b$ without reducing the temperature of the hot gases to such an extent as to intefere with the efficiency of the explosions. Of course, as mentioned before, any kind of cooling agent may be employed. As illustrated in Figs. 1 and 3$^b$, the shaft $i$ of the breech is tubular and contains two conduits 3 and 4, which do not communicate directly with each other. The conduit 3 serves for the circulation of the fluid in the chambers $b'$ $b^8$ and the conduit 4 for the exit of the steam produced in the said chambers.

Each of the cooling passages or chambers $b'$ $b^8$ communicates, first, with the conduit 3 by a passage 5, which stops on a level with the inner wall of the chamber; second, with the conduit 4 by a tube 6, one of which extends into the interior of each chamber $b'$ $b^8$, Fig. 1.

It should also be observed that the hollow shaft $i$ revolves with the breech, while the conduits 3 and 4 in the interior of the shaft do not turn. It follows then that the conduits or passages 7, fixed as regards the movable hollow shaft, form a kind of distributer, which will at certain required moments allow the water to pass into the interior of the chambers and the vapors to pass out of the chambers. To avoid heating of the cover-plates, they are preferably provided with hollow centers 8 and 9 or water-passages into which by a lower orifice 10 water can be introduced and steam be collected by the upper orifice 10. These orifices may also be symmetrically coupled for the conduits of both plates.

As has been seen before, the entry of the explosive mixture is accomplished by the orifices $p$ and $q$ in the front plate. These two orifices could therefore be made to communicate with a single conduit from the carbureting device, either by means of two separate conduits coming from the same carbureter or from two carbureters.

The orifices $t$ and $u$, through which the gas passes to the motor, may be made to communicate by means of one tube only either with an intermediate reservoir from which the motor takes the quantity of charge necessary for its work or directly with the motor. Instead of one tube of communication I reserve to myself the right to unite each of the said orifices $t$ and $u$ with an ejector of any kind in general or with an ejector as represented in Fig. 1. The flange 11 is fixed against the back plate to correspond with one of the outlet-orifices $t$ and $u$ and the current of hot gases passes into the central tube or nozzle 12 of the ejector.

As in all ejectors, a depression or suction is formed at 13, which may be made use of either for introducing air to mix with the hot gases or for drawing out the hot gases which remain in the explosion-chambers $a'$ $a^8$ and from which may be, as said before, cleared off any remnants of gas by means of a current of air. To take these hot gases away by suction produced in the chamber 13, Fig. 1, it is sufficient to close the air-orifices $r$ $s$ of the front plate and to join the air-orifices 1 2 of the back plate with the suction-chamber 13 by means of connecting-pipes 14.

15 indicates branch pipes leading from conduit 4 to the suction-chambers 13, so that the steam may be exhausted from conduit 4 and the chambers communicating therewith.

The apparatus is used in connection with parts to be now described with reference to Figs. 8 and 9.

B indicates a carbureter which is provided with a branched pipe B', the branches of which are connected with openings $p$ and $q$ in the front plate $j$.

D indicates a rotary motor at the rear end of the apparatus and which is connected by a tube D' with the back plate $k$ of the apparatus by means of branch tubes $D^2$, which are connected with the ejectors on the back plate. On the shaft $D^3$ of the motor there is mounted a bevel gear-wheel E, which meshes with a bevel gear-wheel E' on a vertical shaft $E^2$. The said shaft $E^2$ carries a suitable ball-governor F, having a collar F', which acts on a rod G, pivoted at G', said rod G acting at its free end on a belt H, which is trained over cone-pulleys H' $H^2$, the former of which is mounted on a shaft I, which is connected by bevel-gearing I' with the shaft $D^3$ of the rotary motor. The pulley $H^2$ is mounted on a counter-shaft J, which carries a pinion J', that meshes with gear-teeth $J^2$, disposed around the rotary breech $c$.

The described mechanism is operated from the rotary motor D in such way as that when the speed of the motor is increased the balls of the governor are separated and the collar F' descends and moves the rod G to the position shown in full lines, so that belt H is shifted on the cone-pulleys and the breech is correspondingly rotated. When the speed of the motor is diminished, the balls of the governor approach each other and the rod G takes the position shown in dotted lines, moving the belt from position $x$ to position $x'$, so as to increase the speed of the breech.

The brief description and showing of the parts extraneous to the apparatus forming the subject of the present invention will enable a clear understanding of the invention.

Having thus described my invention, what I claim as new, and desire to secure by Letters Patent, is—

1. In an apparatus for generating and supplying motive power to motors, the combination of a suitable base, two end or cover plates mounted thereon, a rotary breech arranged between said plates and provided with a number of explosion-chambers for the generation of hot gases, and with a number of cooling-chambers alternating with the explosion-chambers, and said plates being provided, one with inlets for the explosive mixture and the other with outlets for the hot gases, and both with openings for the escape of the remaining gases all of said chambers in the breech being constructed and arranged to communicate at intervals with said inlets, outlets and openings, and means for conveying off the gases for use, substantially as set forth.

2. In an apparatus for generating and supplying motive power to motors, the combination of a suitable base, two end or cover plates mounted thereon, a rotary breech arranged between said plates and provided with a number of explosion-chambers for the generation of hot gases, and with a number of cooling-chambers alternating with the explosion-chambers, and said plates being provided, one with inlets for the explosive mixture and the other with outlets for the hot gases, and both with openings for the escape of the remaining gases, all of said chambers in the breech being constructed and arranged to communicate with said inlets, outlets and openings, and ejectors connected with the outlets, with the said openings and with the cooling-chambers, whereby the remaining gases are sucked out under reduced pressure, together with the steam produced in the cooling-chambers, so that a mixture is formed for the motor proper, substantially as set forth.

In testimony whereof I have signed this specification in the presence of two subscribing witnesses.

LOUIS EDMOND HENRI FIÉVET.

Witnesses:
 EMILE LEDELL,
 EDWARD P. MACLEAN.